Nov. 30, 1954 E. E. SANFORD 2,695,975
TELEVISION DEFLECTION CIRCUIT
Filed Sept. 23, 1950
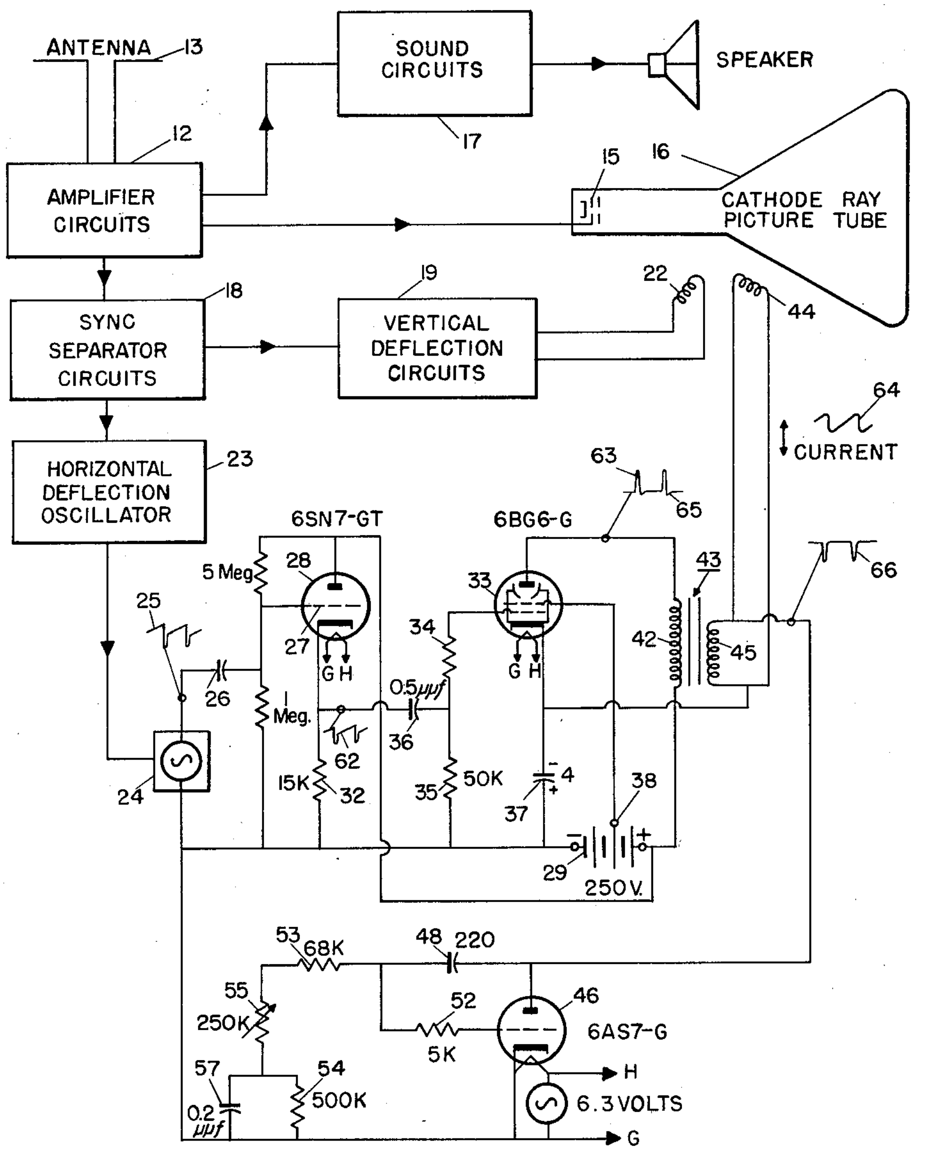
INVENTOR.
EMIL E. SANFORD
BY Darby & Darby
ATTORNEYS United States Patent Office 2,695,975

Patented Nov. 30, 1954

2,695,975

TELEVISION DEFLECTION CIRCUIT

Emil E. Sanford, Clifton, N. J., assignor to Allen B. Du Mont Laboratories, Inc., Clifton, N. J., a corporation of Delaware Application September 23, 1950, Serial No. 186,357

13 Claims. (Cl. 315—27)

This invention pertains to circuits for the electromagnetic deflection of electron beams such as are used in television receivers.

In a television receiver it is desirable to have a large television picture obtained in a small compact cabinet. To this end cathode-ray picture tubes for television receivers have been shaped to have a wide deflection angle. In order to provide deflection for wide angle tubes it is necessary to provide a sawtooth current having a large amplitude in an electromagnetic deflection coil. Cost considerations in television receivers, on the other hand require the use of a comparatively low B supply for the receiver.

It is therefore an object of this invention to provide a circuit which provides a large amplitude sawtooth current in a deflection coil utilizing a comparatively low B supply.

In certain circuits of the prior art utilizing a damper tube, the cathode of the damper tube is operated at a high positive potential. This necessitates either a separate heater supply for the damper tube or else the operation of the tube with a large direct potential between the heater and cathode of the damper tube which practice tends to shorten tube life.

It is therefore a second object of this invention to provide a deflection circuit in which the cathode of the damper tube operates at ground potential.

In the accompanying drawings the only figure is a diagram, partly in block and partly in schematic form, of a television receiver embodying the invention.

In this figure, a television receiver includes an amplifier 12 connected to an antenna 13 from which it receives signals. The amplifier 12 is also connected to and in its turn provides signals to a beam intensity control electrode 15 of a cathode-ray picture tube 16, circuits 17 for amplifying television sound, and synchronization signal separator circuits 18, which latter are connected to vertical deflection circuits 19 providing deflection power for a vertical deflection coil 22 in the usual juxtaposition to the picture tube 16, and to a horizontal deflection oscillator 23.

The horizontal oscillator 23 provides signals for a source 24 of sawtooth voltage having negative impulse components therein as indicated by the wave form 25. The source 24 is coupled through a coupling capacitor 26 to an input electrode or control grid 27 of a cathode follower tube 28. The negative impulses thus applied to the tube render this cathode follower tube periodically less conductive. The cathode follower tube 28 has its anode and output cathode connected respectively to the positive and negative terminals of a direct potential source 29, the cathode being so connected through a load resistor 32.

A horizontal deflection drive tube 33 having a cathode, control grid, screen grid, and anode, has its control grid connected to the negative terminal of the source 29 through two series resistors 34, 35, the former being an oscillation suppressing resistor of low ohmic value, the latter being a grid leak resistor. The junction of the two resistors 34, 35 is connected to the cathode of the cathode follower tube 28 by means of a coupling capacitor 36. This coupling capacitor 36 and the grid leak resistor 35 form a resistance-capacitance circuit whose time constant is long compared to the period of horizontal deflection. The cathode of the drive tube 33 is connected to the negative terminal of the direct potential source 29 through a bypass capacitor 37. The screen grid of the drive tube 33 is connected to a tap 38 on the direct potential source 29, which tap is positive with respect to the cathode.

The anode of the deflection drive tube 33 is connected to the positive terminal of the direct potential source 29 through a primary winding 42 of a phase inverting deflection transformer 43, this being a direct current connection. A horizontal deflection coil 44, also in juxtaposition to the picture tube 16, is connected in parallel with a secondary winding 45 of the transformer 43. The secondary winding 45 is also connected between the cathode of the drive tube 33 and the anode of a damper tube 46, thereby forming a direct current connection. The damper tube 46 is here shown as a triode, although a diode damper tube may also be used if desired. The cathode of the damper tube 46 is connected directly to the negative terminal of the direct potential source 29, thereby avoiding a large potential difference between the heater and the cathode of this tube. The grid and cathode of the damper tube 46 are connected together by a series combination comprising a resistor 52, a resistor 53, an adjustable resistor 55, and the parallel combination of a resistor 54 and a capacitor 57. The plate of the damper tube 46 is connected by means of a capacitor 48 to the junction of the resistors 52 and 53.

In the operation of the circuit the source of signals 24 supplies a signal 25 to the grid of the cathode follower tube 28. These signals are thereby transferred at low impedance to the grid of the drive tube 33 without substantial change in waveform as indicated by the voltage wave form 62. This preferred drive circuit has the advantage that the low output impedance of the cathode follower tube 28 drives the grid of the drive tube 33 into the positive region obtaining greater current output therefrom.

The anode circuit of the drive tube 33 has an inductive load provided by the deflection coil 44 coupled through the deflection transformer 43, so that when the drive tube is periodically cut off by means of the negative impulses in the voltage wave 62, the anode circuit experiences a positive impulse voltage 63, resulting in a desired sawtooth current waveform 64 and voltage form 66 in the deflection coil 44. Negative flyback oscillations in the wave form 63 are damped out by the action of the damper tube 46, so that only small negative excursions 65 remain in the plate voltage wave 63, and no positive excursions occur in the inverted wave 66.

In absorbing the negative voltage peaks 65, the damper tube 46 draws current, tending to charge the condenser 37 and providing a negative bias for the cathode of the drive tube 33. This bias voltage acts to effectively increase the B supply applied between anode and cathode of the drive tube 33 and to increase the output thereof. In the case of typical operation of the preferred circuit shown a drive tube cathode voltage approximately 100 volts more negative than the negative terminal of the direct potential source 29 is obtained.

Grid current of the tube 33, flowing through the grid leak resistor 35 builds up a negative bias between the grid and the cathode of this tube. It has been found that a single 250 volt supply for drive tube 33 is supplemented by approximately 125 negative grid volts provided by grid current, which makes a total of 375 volts effectively between the grid and anode of the deflection drive tube 33. The 100 volt negative cathode bias, added to the 250 volt anode supply, provides a total of 350 volts between the cathode and anode. The grid is, then, biased 25 volts negative with respect to the cathode.

The effectively increased supply voltage, together with the ability of this circuit to operate effectively in the positive grid region of the drive tube 33, result in obtaining maximum deflection amplitude from a low voltage direct current supply.

Economies of equipment, of great importance in the mass manufacture of television receivers, are realized since the main B plus supply of a receiver need only be 250 volts to obtain deflection amplitudes formerly only obtainable from supplies of 375 volts and above, which required more expensive electrolytic filter capacitors for the high voltages.

The circuit described is particularly useful in cathode-ray test equipment where an output current adjustable in magnitude can be obtained by varying the magnitude of only the drive voltage 25. There is a safety feature in that, in the event of failure of the drive voltage, the cathode of the tube 33 will acquire a positive potential reducing plate and screen current flow and prevent overheating.

Although only a specific embodiment has been described, illustrating the principle, variations thereof may be made without departing from the spirit or scope of the invention.

What is claimed is:

1. An electromagnetic deflection circuit for television which comprises a deflection drive tube having a cathode, a control grid, and an anode, a source of direct potential connected thereto having positive and negative terminals, a deflection coil driven by said drive tube, a damper tube having an anode and a cathode, said cathode being connected to said negative terminal of the source of direct potential, a deflection transformer having a primary winding connected between said first-mentioned anode and said positive terminal and a secondary winding connected in parallel with said deflection coil, said secondary winding being also connected between said cathode of said drive tube and said anode of said damper tube, a bypass capacitor connected between said cathode of said drive tube and one of said terminals of said source of direct potential, and a source of periodic horizontal drive signals connected between said control grid and said cathode of said drive tube.

2. In a television receiver deflection circuit, a deflection drive tube having a cathode, a control grid and anode, a source of positive potential having a positive terminal and a negative terminal, said positive terminal having a direct current connection to said anode, and a damper tube having an anode and a cathode, said cathode of said damper tube having a direct current connection to the negative terminal of said potential source, said anode of said damper tube having a direct current connection to said cathode of said drive tube.

3. The deflection circuit of claim 1 in which said deflection transformer is connected to be phase inverting.

4. The deflection circuit of claim 1 in which said damper tube is a triode having its grid connected to its anode through a second capacitor and to its said cathode through resistors in series, one of said resistors being bypassed by a third capacitor.

5. The deflection circuit of claim 1 in which said source of periodic horizontal drive signals is a cathode follower tube, the cathode of said cathode follower tube being coupled to the grid of said drive tube.

6. The deflection circuit of claim 1 in which said source of periodic horizontal drive signals includes a resistance-capacitance network having a time constant which is long with respect to the period of said drive signals.

7. The deflection circuit of claim 1 in which said source of periodic horizontal drive signals includes a grid leak resistor connecting the grid and cathode of said drive tube, a cathode follower tube having a cathode, a load resistor connected between said cathode of said cathode follower and said negative terminal, and a coupling capacitor connected between said cathode of said cathode follower and said grid of said drive tube, said grid leak resistor and said coupling capacitor comprising a network having a time constant which is long compared to the period of said horizontal drive signals.

8. In a television deflection circuit, a deflection drive tube having a cathode and a control grid, a grid leak resistor connecting said cathode and said grid, a cathode follower tube having an output cathode and a control grid, said output cathode being connected through a load resistor to said cathode of said drive tube and through a coupling capacitor to said control grid of said drive tube, and a source of periodic impulses connected between said output cathode and said control grid of said cathode follower in a polarity such that said impulses render said cathode follower tube less conductive, said grid leak resistor and said coupling resistor comprising a network having a time constant which is long compared to the period of said source.

9. In a television receiver deflection circuit, a deflection drive tube having a cathode, a control grid and anode, a source of potential having a positive terminal and a negative terminal, said positive terminal having a direct current connection to said anode, a damper tube having an anode and a cathode, said cathode of said damper tube having a direct current connection to the negative terminal of said potential source, said anode of said damper tube having a direct current connection to said cathode of said drive tube, and an impedance connected between said cathode and said damper tube and said negative terminal of said source of potential.

10. The circuit in accordance with claim 9 in which said impedance comprises a capacitance.

11. In a horizontal sweep section of a television instrument, a horizontal sweep power output tube having plate and cathode and grid elements, a driving circuit for said tube comprising grid and cathode elements of said tube and a substantially continuous and uniform source of signal voltage of predominately negative factor; an output transformer having a primary and secondary windings; a plate circuit for the output tube comprising a primary winding of the transformer and plate and cathode elements of the tube; a power output circuit comprising a secondary winding of the transformer and a horizontal yoke coil; and a safety power control circuit for said output tube comprising a secondary winding of the transformer, a rectifier, and an element of the tube other than the plate thereof and which responds to potential of proper polarity to cause an increase in plate current, the said safety power control circuit applying a D. C. potential to the said element of the tube which is of a polarity to increase the plate current flow in the tube, the predominately negative tube driving voltage being of sufficient value to reduce plate current flow in the tube below normal in the absence of the said control potential provided by the safety control circuit, the safety control circuit supplying a sufficient value of control potential to the said element of the tube to increase the plate current flow of the tube to a desired normal operating value in the presence of the predominately negative tube-driving signal voltage and to cause excessive plate current flow in the tube and overloading thereof in the absence of said predominately negative driving signal voltage, energization of the safety control circuit being dependent upon the presence of said predominately negative driving signal voltage and failing as a result of drive voltage failure to thereby prevent overloading of the tube and associated circuits and components as a result of drive voltage failure.

12. In a horizontal sweep section of a television instrument, a horizontal sweep power output tube having plate and cathode and grid elements, a driving circuit for said tube comprising grid and cathode elements of said tube and a substantially continuous and uniform source of signal voltage of predominately negative factor, a plate circuit for the output tube comprising plate and cathode elements of the tube; a horizontal yoke coil, coupled to the plate circuit for energization by signal voltage developed therein; and a safety power control circuit for said output tube comprising an element of the tube other than the plate thereof and which responds to potential of proper polarity to cause an increase in plate current, and a rectifier coupled to the plate circuit for energization by signal energy developed in the plate circuit and coupled to the last said element of the output tube for energization of the latter by rectified signal voltage of proper D. C. polarity to cause an increase in plate current flow in said tube; the predominately negative tube driving voltage being of sufficient value to reduce plate current flow in the tube below normal in the absence of the said control potential provided by the safety control circuit, the safety control circuit supplying a sufficient value of control potential to the said element of the tube to increase the plate current flow of the tube to a desired normal operating value in the presence of the predominately negative tube-driving signal voltage and to cause excessive plate current flow in the tube and overloading thereof in the absence of said predominately negative driving signal voltage, energization of the safety control circuit being dependent upon the presence of said predominately negative driving signal voltage and failing as a result of drive voltage failure to thereby prevent overloading of the tube and associated circuits and components as a result of drive voltage failure.

13. In a horizontal sweep section of a television instrument, a horizontal sweep power output tube having plate and cathode and grid elements, a driving circuit for said tube comprising grid and cathode elements of said tube and a substantially continuous and uniform source of signal voltage of predominately negative factor, a plate circuit for the output tube comprising plate and cathode elements of the tube, a horizontal yoke coil coupled to the plate circuit for energization by signal voltage developed therein; and a safety power control system for said output tube, said system comprising an element of the tube other than the plate thereof and which responds to potential of proper character to cause an increase in plate current, and means coupled to the last said tube element and associated with and under control of the plate circuit and applying a control potential to the last said tube element responsive to the presence of a signal voltage in the plate circuit and which is of a character to increase plate current flow in the tube; the predominately negative tube driving voltage being of sufficient value to reduce plate current flow in the tube below normal in the absence of the said control potential provided by the safety control system, the safety control system supplying a sufficient value of control potential to the said element of the tube to increase the plate current flow of the tube to a desired normal operating value in the presence of the predominately negative tube-driving signal voltage and to cause excessive plate current flow in the tube and overloading thereof in the absence of said predominately negative driving signal voltage, drive voltage failure resulting in a reduction of the control potential applied by the safety control system to the said element of the tube to a value whereat the plate current in the tube is reduced to a safe operating value, whereby to prevent overloading of the tube and associated circuits and components as a result of drive voltage failure.

References Cited in the file of this patent

UNITED STATES PATENTS

| Number | Name | Date |
|---|---|---|
| 2,211,614 | Bowie | Aug. 13, 1940 |
| 2,440,786 | Schade | May 4, 1948 |
| 2,589,299 | Setchell | Mar. 18, 1952 |